May 1, 1934.  L. O. REICHELT  1,956,730
METHOD OF MAKING ELECTRICAL CABLES
Filed Sept. 11, 1929
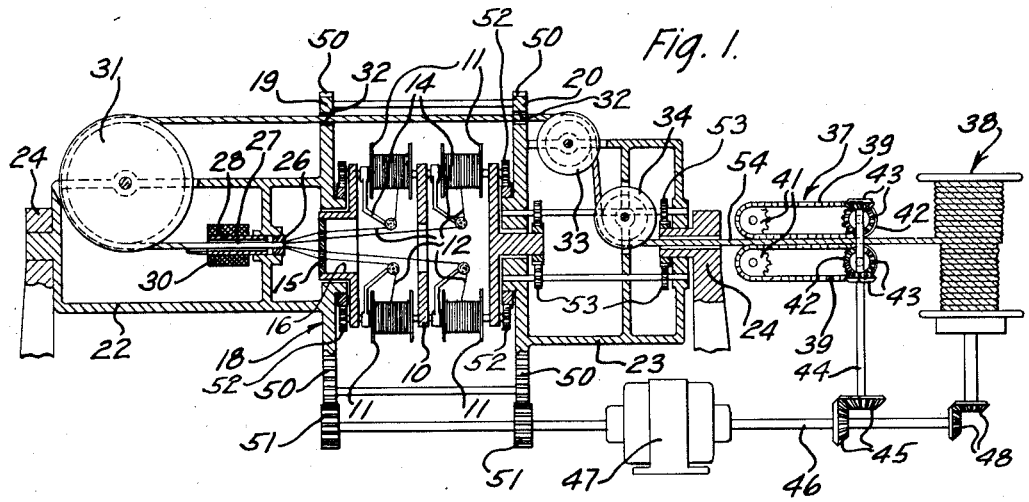
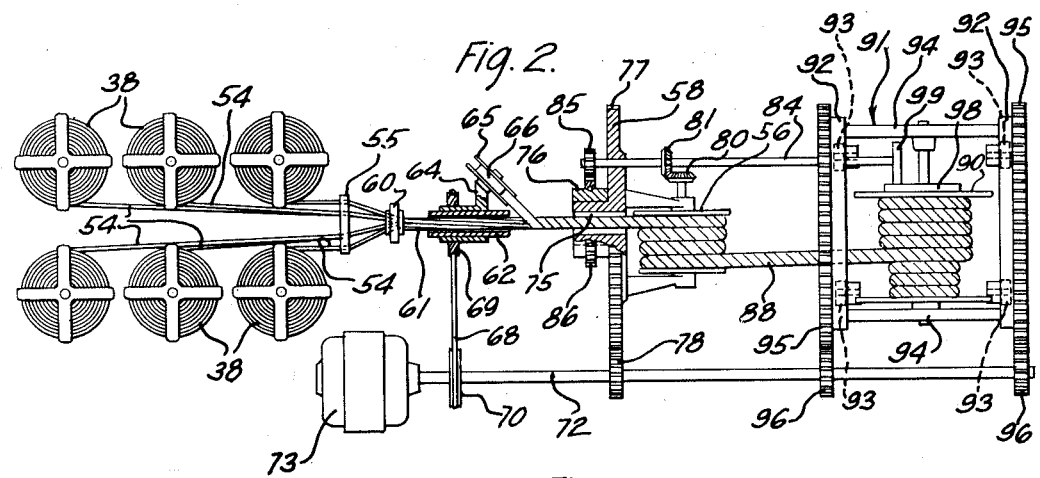
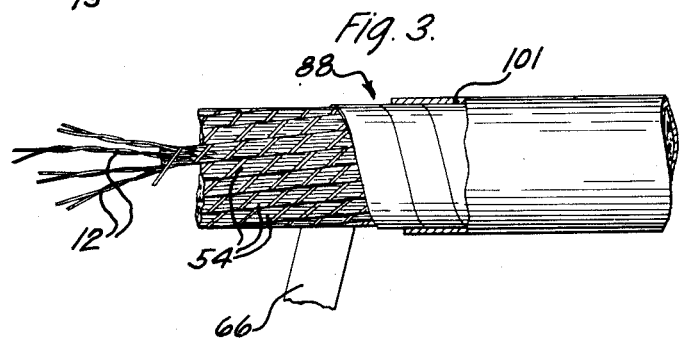
Inventor
Lester O. Reichelt
By H. A. Patterson Att'y.

Patented May 1, 1934

1,956,730

UNITED STATES PATENT OFFICE 1,956,730

METHOD OF MAKING ELECTRICAL CABLES

Lester O. Reichelt, Cranford, N. J., assignor to Western Electric Company, Incorporated, New York, N. Y., a corporation of New York Application September 11, 1929, Serial No. 391,719

3 Claims. (Cl. 117—59)

This invention relates to electrical cables and a method of making the same, and more particularly to multi-conductor cables of the type employed for the transmission of intelligence electrically.

Objects of the present invention are to improve the construction, reduce the cost, and expedite the manufacture of multi-conductor cables.

In accordance with the above objects, one embodiment of the invention contemplates the provision of an improved method of forming multi-conductor cables of the type employed for telephone communication, wherein a plurality of twisted pairs of individually insulated electrical conductors are assembled and stranded or twisted together into a compact group or cable unit in such manner that a predetermined surplus length of certain of the individual conductors is present in the unit thus formed. A plurality of these units are thereafter assembled and stranded together into a compact cylindrical composite or cable of the desired size in such manner that the surplus length of the conductors in the individual units is absorbed or removed so that the individual conductors in the finished cable are of the exact length to constitute a so called "dead" cable. The cable thus formed is usually covered with a protective sheathing of lead or other suitable material.

It is believed that the method will be clearly understood from the following detailed description when read in conjunction with the accompanying drawing, wherein Figs. 1 and 2 are schematic views of apparatus by means of which the improved method may be practiced, and Fig. 3 is an elevational view, partly in section, of a multi-conductor cable produced in accordance with the method of the present invention, a portion of the cable being shown partially disassembled in order to more clearly illustrate the improved construction.

As described above, the first step in the method of the present invention consists in assembling and twisting a plurality of twisted pairs of individually insulated electrical conductors into a single compact group or so called cable unit in such manner that a predetermined amount of surplus material is introduced in the unit. A preferred form of apparatus by means of which this step of the method may be practiced is fully illustrated and described in U. S. Patent 1,813,197, granted to me July 7, 1931. As illustrated schematically in Fig. 1 of the accompanying drawing, this apparatus comprises a normally stationary drum or strand supply carrier 10 adapted to support a plurality of rotatable spools or reels 11, each containing a twisted pair of individually insulated electrical conductors 12, hereinafter called strands. The supply reels 11 are mounted with their individual axes parallel to and spaced from the longitudinal axis of the machine and are arranged with suitable tension controlling arms 14, 14 provided at their extremities with suitable sheaves or pulleys over which the strands 12 drawn from the supplies are guided through a stationary distributor plate 15 mounted in a hub portion 16 of the carrier 10. The distributor plate 15 is provided with a plurality of spaced apertures for guiding the individual strands and for determining their ultimate relative positions in the finished cable unit.

A flier 18 comprising a pair of spaced interconnected annular disks 19 and 20 and reduced tubular end portions 22 and 23 is rotatably supported in suitable pedestals or standards 24—24. Mounted within the tubular portion 22 of the flier so as to be rotatable therewith is a sizing die 26 through which the strands are drawn after passing through the distributor plate 15. The sizing die 26 is designed to assemble the strands into a single compact group or bundle 27 of circular cross-section, the assembled group 27 thereafter passing through a sleeve 28 coaxial with the sizing die 26 and rotatable therewith. A supply cop 30 of cotton or other suitable binding material is mounted upon the sleeve 28, and it will be understood that the binding material is drawn from the cop 30 and spirally wrapped around the assembled group of strands as it emerges from the end of the sleeve 28. In this manner the assembled group of strands is tightly bound together with the individual strands maintained in their proper relative positions as predetermined by the distributor plate 15.

The bound group of strands is drawn over a guide sheave 31 rotatably carried by the left hand tubular portion 22 of the flier and disposed tangentially with respect to the longitudinal axis of the flier. From the sheave 31 the bound group of strands passes through suitable guide apertures 32—32 in the annular disks 19 and 20 of the flier and then around guide sheaves 33 and 34 rotatably carried by the right hand tubular portion 23 of the flier. It will be observed that the sheave 33 is disposed tangentially with respect to a line extending through the center of the guide apertures 31, and the sheave 34 is disposed tangentially with respect to the longitudinal axis of the flier.

A capstan 37, preferably of the caterpillar or tractor type, is provided for drawing the bound group of strands over the guide sheaves 31, 33, and 34 and for delivering the finished cable unit to a take-up reel 38. The capstan 37 comprises a pair of endless conveyor chains 39—39 which are arranged to engage opposite sides of the cable unit. The conveyor chains are adapted to travel around spaced rollers or sprockets 41 and 42, the sprockets 42 being positively driven through bevel gears 43—43, a shaft 44, and bevel gears 45—45 from a main drive shaft 46 connected to an electric motor 47. The take-up reel 38 is also driven from the main drive shaft 46 through a pair of bevel gears 48—48.

The annular disks 19 and 20 of the flier 18 are provided on their peripheries with gear teeth 50—50 which mesh with pinions 51—51 secured to the main shaft 46 whereby the flier is rotated at a predetermined relative speed with respect to the capstan 37 and take-up reel 38. By means of planetary gearing arrangements, designated generally by the reference numerals 52 and 53, the strand supply carrier 10 is suspended between the annular disks 19 and 20 of the flier and is held stationary during the rotation of the flier in the manner described in detail in my copending patent above referred to. A detailed description of these gearing arrangements has been omitted in this application since it is not believed to be essential to a complete understanding of the present invention.

Through the rotation of the flier 18 the assembled group of strands is carried bodily around the strand supplies and the individual strands are thereby twisted or stranded together in a well known manner, the cable unit 54 thus formed being drawn from the flier by the capstan 37 and delivered to the take-up reel 38. The take-up reel 38, when loaded, may be removed and replaced by an empty reel, and the loaded reel may be placed in storage for future use or may immediately be transferred to a cabling machine wherein the cable unit 54 is assembled with other similar units into a cylindrical composite or cable of the desired size.

A preferred form of apparatus for assembling and stranding a plurality of individual cable units 54 into a cylindrical composite or cable is fully illustrated and described in the copending application of H. J. Boe, Serial No. 395,031, filed Sept. 25, 1929. As shown schematically in Fig. 2 of the accompanying drawing, this apparatus comprises a stationary distributor plate 55 through which a plurality of cable units 54 are drawn from rotatable supply reels 38 by means of a capstan 56 mounted upon a rotatable annular supporting plate 58. The distributor plate 55 is provided with a plurality of spaced apertures for guiding the individual cable units and for predetermining their ultimate relative positions in the finished cable.

After passing through the distributor plate the cable units are drawn through a sizing die 60 designed to assemble and compress the individual cable units 54 into a compact cylindrical composite or bundle 61 of substantially circular cross section, the bundle thus formed thereafter passing through a guide sleeve 62 coaxial with the sizing die 60. A paper serving head 64 is rotatably supported upon the sleeve 62 and carries a rotatable supply reel 65 of paper ribbon 66 or other suitable wrapping or binding material. The serving head 64 may be driven through a belt 68 and pulleys 69 and 70 from a main drive shaft 72 connected to an electric motor 73. In the operation of the apparatus the paper ribbon 66 is drawn from the supply reel 65 and spirally wrapped around the assembled bundle of cable units as it emerges from the end of the sleeve 62. This is for the purpose of retaining the compact formation imparted to the assembled bundle of cable units by the sizing die 60. The paper wrapping 66 also serves to maintain the relative positions of the individual cable units 54 as predetermined by the distributor plate 55.

The bundle of cable units after being bound passes through a central aperture 75 in the capstan supporting plate 58, and it will be observed that the capstan 56 is so mounted that the receiving portion thereof is tangentially disposed with respect to the axis of rotation of the supporting plate 58. The capstan plate 58 is rotatably journaled in a bearing 76 and is provided on its periphery with gear teeth 77 designed to mesh with a pinion 78 keyed to the main shaft 72, whereby the plate 58 together with the capstan 56 is revolved around an axis of rotation coinciding with the longitudinal axis of the moving cable. The capstan 56 is driven through the rotation of the annular supporting plate 58 by bevel gears 80 and 81, the gear 81 being keyed to a shaft 84 rotatably carried by the plate 58. A gear 85 keyed to the shaft 84 meshes with a stationary gear 86 fixed to the bearing 76. By this construction it will be understood that the shaft 84 is driven through the rotation of the capstan plate 58 and the shaft 84, in turn, drives the capstan 56 through the gears 80 and 81.

By revolving the rotating capstan in the manner above described, the assembled bundle of cable units 54 is stranded or twisted into a cable having a lay of a definite length as determined by the relative rotative speeds of the capstan 56 and capstan plate 58. This stranding or twisting occurs between the stationary distributor plate 55 and the revolving capstan 56. The cable 88 thus formed, after making several turns around the capstan 56, is delivered to a take-up reel 90 removably mounted in a rotatable cradle 91. The cradle 91 comprises a pair of spaced annular rings 92—92 supported upon spaced rollers 93—93 and rigidly interconnected by cross pieces 94—94.

The annular rings 92 are provided with flanged peripheral portions formed with gear teeth 95—95 which mesh with pinions 96—96 keyed to the main shaft 72 whereby the cradle 91 and take-up reel 90 are revolved at the same speed as the capstan 56 and capstan plate 58 and around an axis of rotation coinciding with the axis of rotation of the capstan plate 58. Consequently, there is no additional twisting between the capstan and the take-up reel. The take-up reel is rotatably mounted in the cross pieces 94 of the cradle and may be driven from the capstan drive shaft 84 through friction wheels 98 and 99.

When practicing the invention by the use of the above described apparatus, the flier 18 and the capstan 37 (Fig. 1) are driven at such relative speeds that the individual strands of the unit 54 are twisted or stranded together with a lay of a definite predetermined length. It will be understood that two twists in the same direction are introduced in the strands for each rotation of the flier 18. The first of these twists occurs between the stationary distributor plate 15 and the guide sheave 31 and the second twist occurs between the guide sheave 33 and the capstan 37. The length of twist or lay in the finished unit is determined by the relative speeds of the flier 18 and capstan 37. These speeds may be varied in any well known manner in accordance with the length of lay desired.

The assembled unit of strands is bound sufficiently tight at the point of the first twist to prevent relative longitudinal movement of the individual strands, and consequently, the amount of material or, in other words, the lengths of the individual strands in a given length of the finished unit are predetermined at the point of the first twist and correspond to the length of the lay produced by the first twist. Thus, upon introducing the second twist the individual strands must adjust themselves to a lay which is one-half the length of the initial lay or of that for which there is sufficient material in the unit. This causes a tightening of the outer strands and a resulting corresponding reduction in the overall length of the unit which results in a surplus length of material in the inner strands. This surplus manifests itself by a bulging or kinking effect of the inner layers of the unit. In assembling these units into the cable by the apparatus shown in Fig. 2, they are twisted together in a direction opposite to that in which the strands of the individual units were twisted and with a lay of twice the length of the final lay in the units. Therefore, each lay placed in the cable removes exactly one lay in the strands of the individual units, and the final lay within the units when assembled in the cable is the same length as that of the cable and is also the exact length for the material in the unit. Thus, the surplus length of material in the inner strands of the unit is absorbed and the finished cable contains just sufficient material to constitute a so-called "dead" cable.

A multi-conductor telephone cable embodying the features of and produced in accordance with the present invention is shown in Fig. 3 with a portion thereof disassembled in order to illustrate the improved construction. Cables of this type are usually provided with a protective sheathing 101 of lead or other suitable material. It has been found that the individual strands or conductors of a cable embodying the present invention are of the correct length for the lay of the cable and therefore are free from abnormal tensions or strains which tend to curl or kink the cable when unwound from a reel.

In the manufacture of telephone cables, the method of the present invention has not only resulted in a saving of material by predetermining the exact length of the individual conductors required in the finished cable, but has also expedited production considerably, since it is obvious that the units may be made up in large quantities and placed in storage for future use and readily and quickly assembled into cables of the desired size in accordance with each particular future requirement.

It is to be understood that the apparatus herein illustrated and described is merely representative of one type of apparatus by means of which the method may be practiced and does not in any way limit the scope of the present invention as defined by the appended claims.

What is claimed is:

1. The method of making multi-conductor cables, which consists in assembling and twisting a plurality of individually insulated conductors into a single unit with a lay of a definite length, applying a binder around the unit of conductors to retain the relative positions of the individual conductors, twisting the bound unit of conductors to reduce the overall length of the unit and thereby introduce surplus conductor lengths in the inner layers of the unit, and then stranding a plurality of units together in a direction opposite to the direction of the conductor twists in the unit and with a lay of such length as to absorb the surplus conductor lengths in the unit.

2. The method of making multi-conductor cables, which comprises assembling and binding a plurality of individually insulated electrical conductors into compact unit, twisting the conductors of the unit to introduce surplus lengths thereof in the unit, and assembling and stranding a plurality of said units into a cable with a lay contour opposite to that of the conductor twists to partially untwist the conductors of the units and thereby remove a portion of the surplus conductor lengths.

3. The method of making cables, which comprises assembling a plurality of strands into a single group, applying a binder around the group of strands, twisting the bound group of strands to reduce the over-all length thereof and thereby introduce surplus strand material therein, and then stranding a plurality of groups together in a direction opposite to the direction of the strand twists so as to absorb a portion of the surplus strand material.

LESTER O. REICHELT.